(12) United States Patent
Bortz

(10) Patent No.: US 6,402,326 B1
(45) Date of Patent: Jun. 11, 2002

(54) FIXED IMAGE PROJECTING APPARATUS

(76) Inventor: Daniel Bortz, 837 N. Cahuenga Blvd., Hollywood, CA (US) 90038

( * ) Notice: Subject to any disclaimer, the term of this patent is extended or adjusted under 35 U.S.C. 154(b) by 0 days.

(21) Appl. No.: 09/832,075

(22) Filed: Apr. 9, 2001

Related U.S. Application Data

(63) Continuation of application No. 09/393,602, filed on Sep. 10, 1999, now Pat. No. 6,227,672, which is a continuation-in-part of application No. 08/790,819, filed on Jan. 30, 1997, now Pat. No. 5,951,137.

(51) Int. Cl.[7] .............................................. G03B 21/14
(52) U.S. Cl. ........................ 353/119; 353/96; 353/103; 353/52
(58) Field of Search ........................... 353/23, 24, 58, 353/60, 88, 92, 98, 95, 96, 108, 114, 118, 119, 122, 52, 57

(56) References Cited

U.S. PATENT DOCUMENTS

| | | | | |
|---|---|---|---|---|
| 3,554,638 A | * | 1/1971 | Dimitracopoulos | .......... 353/57 |
| 5,170,196 A | * | 12/1992 | Itoh | ............................ 353/122 |
| 5,663,762 A | * | 9/1997 | Nishiyama | .................... 353/76 |
| 5,951,137 A | * | 9/1999 | Bortz | ........................... 353/96 |
| 6,227,672 B1 | * | 5/2001 | Bortz | ........................... 353/96 |

\* cited by examiner

*Primary Examiner*—William Dowling
(74) *Attorney, Agent, or Firm*—David O'Reilly

(57) ABSTRACT

A fixed image projection system that can project an image for a short or long period of time without damage to the film. The system is comprised of a light source having a halogen lamp and a cold coated reflector detachably mounted on a housing having film guides or rails for receiving a film frame. The housing includes a plurality of whisper fans that draw cool air into the housing and expel it from the opposite sides of the housing to maintain a relatively cool temperature at the film frame. Preferably, the fans have a dual speed control to allow a higher speed as an option. A lens barrel is detachably supported on the opposite side of the housing from the light source and includes movable lenses to focus the image. Images may be fed into the system on a film frame one at a time, or by motorized film canisters that allow forward or backward advancement to a selected image on a roll containing multiple images.

15 Claims, 9 Drawing Sheets

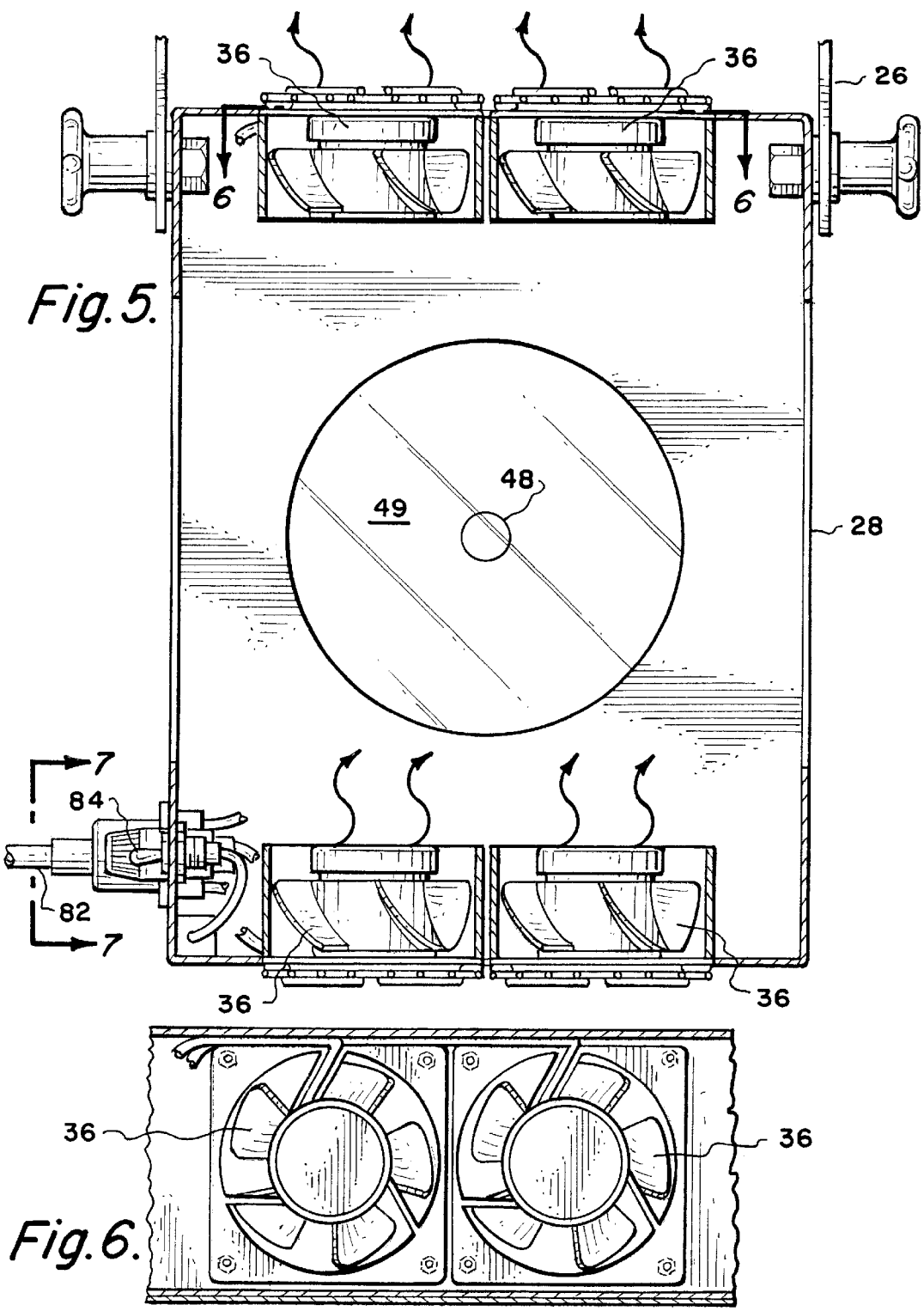

FIXED IMAGE PROJECTING APPARATUS

This Application is a Continuation of application Ser. No. 09/393,602, filed Sep. 10, 1999; now U.S. Pat. No. 6,227,672, Continuation-In-Part of application Ser. No. 08/790,819 filed Jan. 30, 1997, now U.S. Pat. No. 5,951,137 issued Sep. 14, 1999.

BACKGROUND OF THE INVENTION

1. Field of the Invention

This invention relates to scenic image projection equipment and more particularly, relates to a fixed image projector that projects and holds a single image for a long period of time (e.g., four to six weeks at ten hours per day) or a series of images sequentially. The system also includes an improved remote-control image changer or scroller utilizing a heat eliminating light source.

2. Background Information

Image projectors, for projecting an image and holding it for a period of time, are used at trade shows, presentations, etc. A film image is mounted in a frame positioned in a light house. Intense light is focused through the film image for projection on a plane such as a large screen, wall or other surface so that the image is clearly visible in a well lighted environment. To provide an output with desirable color temperatures, current scenic image projectors use very bright high energy lamps which generate substantial heat. This excessive heat damages photographic images or transparencies that are being displayed. Typically, they last only ten to forty minutes in these units.

To overcome the heat, projectable images are transferred to heat resistive and invariably expensive materials such as metal, glass, high temperature paint or heavy cibachrome. Transferring images to any of these media is also expensive and time consuming. Fans are also employed to provide cooling. However, the fans necessary to provide cooling, which is still not entirely sufficient, are consciously noisy. Additional steps involve using heat shields which decrease light output.

All these attempts to solve the problem of excessive heat result in many disadvantages of present scenic image projectors sometimes called "scene machines." The fans and additional structure make these machines heavy and unwieldy; they range in weight from 80 to 300 pounds. The fans are excessively noisy, and the heat resistant materials used to hold projectable images are expensive. Moreover, they are creatively limited. Metal slides are solely for crude images. Images on glass are too costly for common use. High temperature pains are hazardous and cibachrome fiber cannot withstand the heat for very long, particularly for images that have dark colors. Because of these problems and the added expense to solve them, the machines are at present very costly running from $10,000.00 to $80,000.00.

Another disadvantage is that the present projectors project a full frame. Existing models have no shutters so combining images is very difficult. What is needed in an image projector is shutters (on the focal plane), an extremely quiet cooling fan system and most important, the ability to project low cost acetate material generated from color copiers and to be able to project these images for extremely long periods of time (four to six weeks at ten hours per day) with no degeneration.

Other attempts to solve the problem involve creating an image on a medium capable to withstand substantial heat such as glass. This is a somewhat effective solution, but is costly.

Similar image projectors are commonly used in theater, film, entertainment and event production to project large format images ranging in size from 6 ft.×6 ft. to 100 ft.×200 ft. However current projectors employ multiple heat shields which greater reduce light output, and necessitate the use of high-noise CFM cooling fans between the light source and the image. The high temperatures also require images to be transferred to a heavy heat-resistant ilpha chrome film or a high-temperature glass media both of which have a limited projection life and require expensive photographic lab time to produce. Production of the images can often take up to three days and if a one-day turn around should be necessary exorbitant fees apply.

Another drawback to the conventional scenic projectors is that despite the heat shields and fans a more convenient acetate material melts quickly. It would be extremely advantageous if an automatic scrolling system could be provided that scrolls at full color using acetate media which can be made at a fraction of the cost of conventional material now used.

It is therefore, one object of the invention to provide a low heat fixed image projector.

It is another object of the invention to provide a fixed image projector that will project and hold an image for a substantial period of time without damage to the film.

Yet another object of the invention is to provide a low heat fixed image projector that can sequentially display a series of images.

Yet another object of the present invention is to provide a low heat fixed image projector with a motor drive sequential display.

Another object of the present invention is to provide a fixed image projector with improved lumen output.

Yet another object of the present invention is to provide a low heat level fixed image projector that provides an intensive spotlight in a film image with a cold coated reflector to disperse heat away from the film.

Still another object of the present invention is to provide a fixed image projector having low noise cooling fans to draw cooling air over the plane of the film and disperse heated air away from it.

Still another object of the present invention is to provide a fixed film projector having very quiet dual speed fans to draw cooling air over the film and disperse heated air.

Yet another object of the present invention is to provide a fixed image projector having a remote controlled motor driven sequential stepped image system having sensor means to stop a sequential image in registration with a frame.

Still another object of the invention is to provide a fixed image projector with easily adjusted shutters.

Yet another object of the present invention is to permit the use of low cost and creatively flexible material, such as acetate images, inexpensively made on a color copier Still yet another object of the present invention is to provide an automatic remote control scroller that reduces manufacturing cost, heat, weight, and uses low-cost image material providing a multi-image scenic projection system that offers substantial advantages over conventional scenic projectors.

Still another object of the present invention is to provide an automatic scrolling system that allows images to be projected at full color with acetate media.

Still yet another object of the present invention is to provide an automatic scroller that can be produced at a cost of less than one half of traditional remote-control scenic projectors.

BRIEF DESCRIPTION OF THE INVENTION

This invention relates to a fixed image projector that prevents damage to a film image that is held for long periods of time.

This invention relates to a fixed image projector that allows images to be projected and held for long periods of time as distinguished from a motion picture camera in which the film is in motion at a fixed number of frames per second. The projector of this invention can project fixed or still scenic images for minutes, hours or even weeks without damage.

The fixed image projector of the present invention has three sections that can be easily separated for repair, replacement or exchange. A center section is comprised of a housing having low volume two speed fans, that can draw cool air over the film or image plane and expel hot air out the opposite side. The fans, at their lowest speed setting, which is sufficient for most purposes, are very quiet and unobtrusive; unlike the cooling systems of prior art image projectors. A higher speed is an option provided that may be infrequently desired or needed.

The center section also includes mounting rails or guides for receiving an image from having a film mounted in slots constructed to slide into position in a gate. The image or film mounting frame, for manual operation, can have a single film image or multiple film images that can be sequentially displayed by advancing the frame in the rails to sequentially position an image in a gate.

In an alternate embodiment, the film is mounted in a frame with a remote controlled motorized film canister on one end and a second motorized film canister on the other end having a spool driven by the motor. The frame slides into the rails with an opening or gate positioned for displaying the images. A sensor, preferably magnetic, is positioned in the frame at the gate to detect a small magnetic or sensor strip on the film to accurately position the film image in the gate as it is advanced by the motor. Each time the motor is activated directly or remotely, the film advances to the next image and stops when the sensor detects the next sensed strip on the film. Up to approximately thirty (30) images may be sequentially displayed one at a time, with pauses as long as the operator or presenter wants between each frame. Such a system is ideal for presentations to large audiences where a large bright image is advantageous.

An automatic remote-control image scroller utilizes properties of a dichroic or "cold-coated" mirror that eliminates the infrared spectrum thereby reducing heat from the projector's light beam without use of a heat shield between the light source and the image area. The automatic remote-control multi-image changer or scroller takes advantage of this reduced heat to provide scenic projections which can support the use of convenient and economical acetate material. Preferably images of this size are 4×4 inches. The image changer allows from one to 30 images in a 150 inch one-way scroll or an endless loop which can be mounted remotely with a standard DMX 512 control console.

Attached to the center section, on one side, is a low heat intense light source with a cold coated reflector. The light source is generally a source such as a HPL-575 HX-600 halogen lamp having high lumen output with a cold coated reflector. One such light source, suitable for use in the system, is a model Source 4 PAR MCM-CL spotlight manufactured by Electronic Theater Controls of Middleton, Wis. having a metal cold coated mirror. This light source directs the light toward the image and allows substantial heat to be dispersed in the opposite direction away from the image.

An additional option, to further minimize heat, is to provide a lens in front of the lamp, such as a clear flat glass lens which is less preferable as each transparent barrier between the source and lens reduces the image brightness as much as eight percent (8%). With prior art, all devices such as barriers are absolutely necessary to reduce the heat intensity at the film image, and result in reduced image brightness.

The light source is mounted in a light aluminum housing that has mounting slots that engage mounting flanges on the center section. The light source is properly positioned behind the gate film image when the center section flanges engage the light housing slots.

A third section is in the form of a lens barrel that mounts on the center section in front of the film image gate. Focusing lenses are slidably mounted in the barrel and are adjusted to focus a film image in the gate on a surface. After the lenses are adjusted to focus the image, they are clamped and locked with a threaded clamp that is screwed down tightly to lock the adjusting knob.

Shutters are provided by a series of magnets around an image in the image frame and metal plates held in place by the magnets. Various size and shape metal plates permit cropping an image as desired.

The above and other novel features of the invention will be more fully understood from the following detailed description and the accompanying drawings, in which: dr

BRIEF DESCRIPTION OF THE DRAWINGS

FIG. 5 is a sectional view taken at 5—5 of FIG. 1.

FIG. 6 is a sectional view of the fan cooling system taken at 606 of FIG. 5.

DETAILED DESCRIPTION OF THE INVENTION

Figure 1:
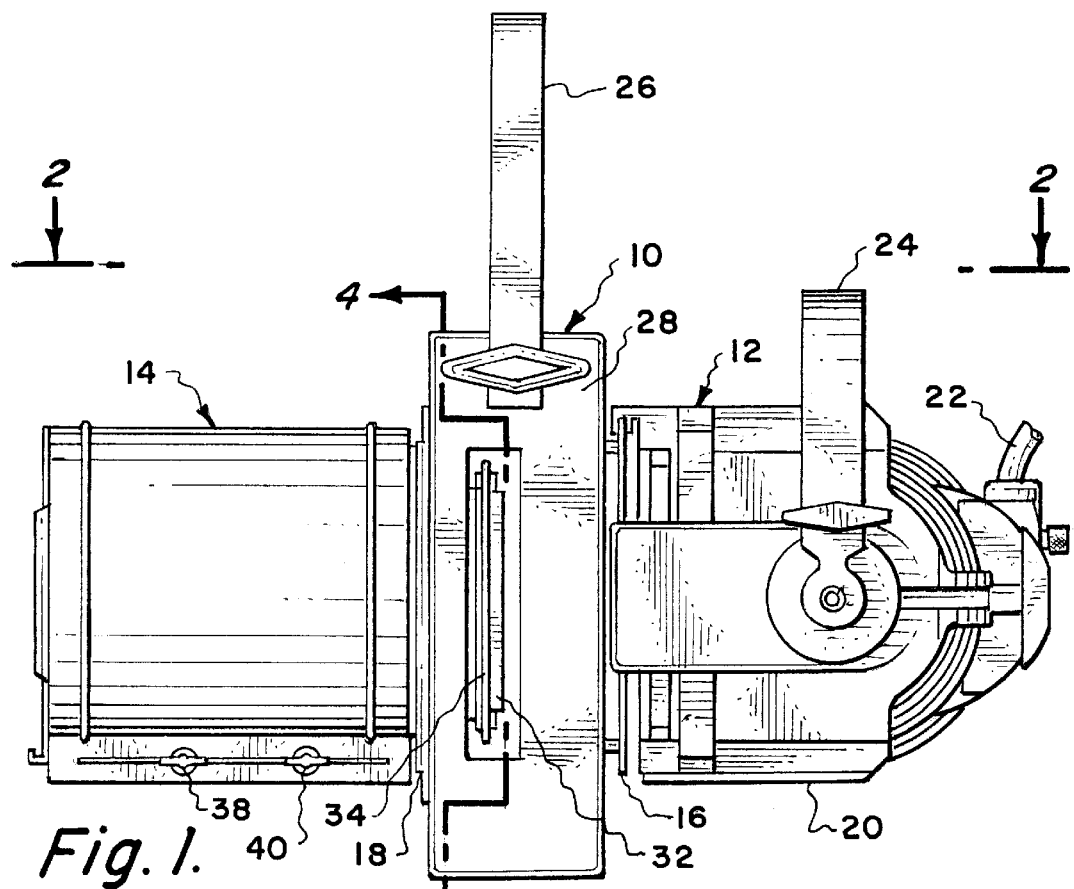
FIG. 1 is a side elevation of a fixed image projector according to the invention.
Figure 2:
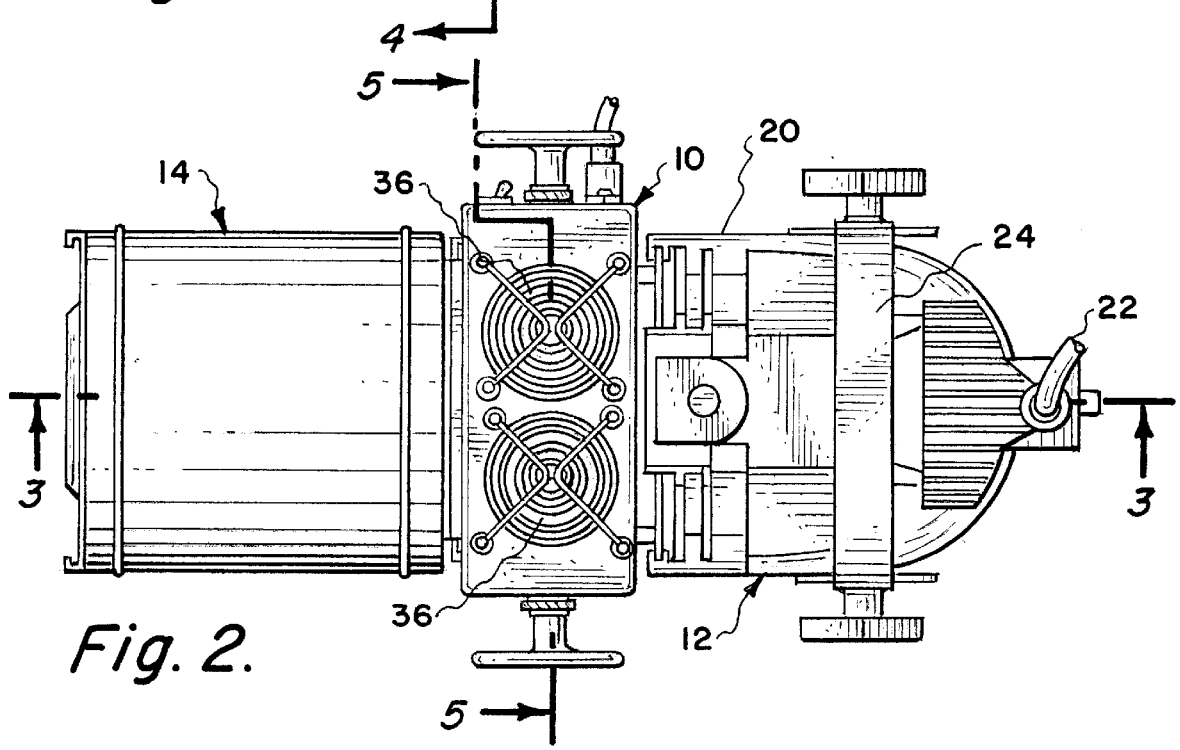
FIG. 2 is a top view taken of the fixed image projector taken at 2—2 of FIG. 1.

An improved fixed image scenic projection system is generally illustrated in FIGS. 1 and 2. The system has three sections; cooling and film frame section 10, light section 12 and lens barrel 14. Cooling and film frame section 10 has flanges 16 and 18 on either side for detachably mounting light source 12 and lens barrel 14. Each can be detached from film frame and cooling section 10 by applying an upward force on the housing. Thus, the light source 12 and lens barrel 14 may be easily removed for replacement, repair or exchange.

Light source 12 is comprised of an aluminum housing 20 that maximizes cooling of the lamp, a power cord 22 to provide power to the lamp and handle 24 for easily carrying the light source, or lifting it off the cooling and film frame section 10. The light source is an important component of the invention because it provides an intense light to display a fixed scenic image, which minimizes heat falling on the image plane. Light source 12 is preferably a light source having a high intensity halogen lamp and a cold coated filter that projects maximum light toward the image while dispersing heat. A light source, such as Model No. S4PAR-CL available from Electronic Theater Controls (ETC) of Middleton, Wis. is preferred. However, any light source that uses a cold coated reflector, with a reflective coating to dissipate heat would be suitable as a light source.

Center cooling and film frame section 10 has a handle 26, a rectangular metal housing 28, having a film frame slot 30 on opposite sides to allow film frame 32 to be inserted in film frame slide rails 34. Cooling and film frame section 10 also has a plurality of whisper fans 36 in the top (FIG. 2) and the bottom for moving air across the plane of a transparency in film frame 32, as will be described in greater detail hereinafter.

Lens barrel 14 has double focusing adjustment locking wing nuts 38 and 40. Focus adjusting wing nuts 38 and 40 allows lenses 50 on alignment rods 52 to be moved forward and backward to focus the image on a surface which is then locked by screwing down the locking wing nuts.

Figure 3:
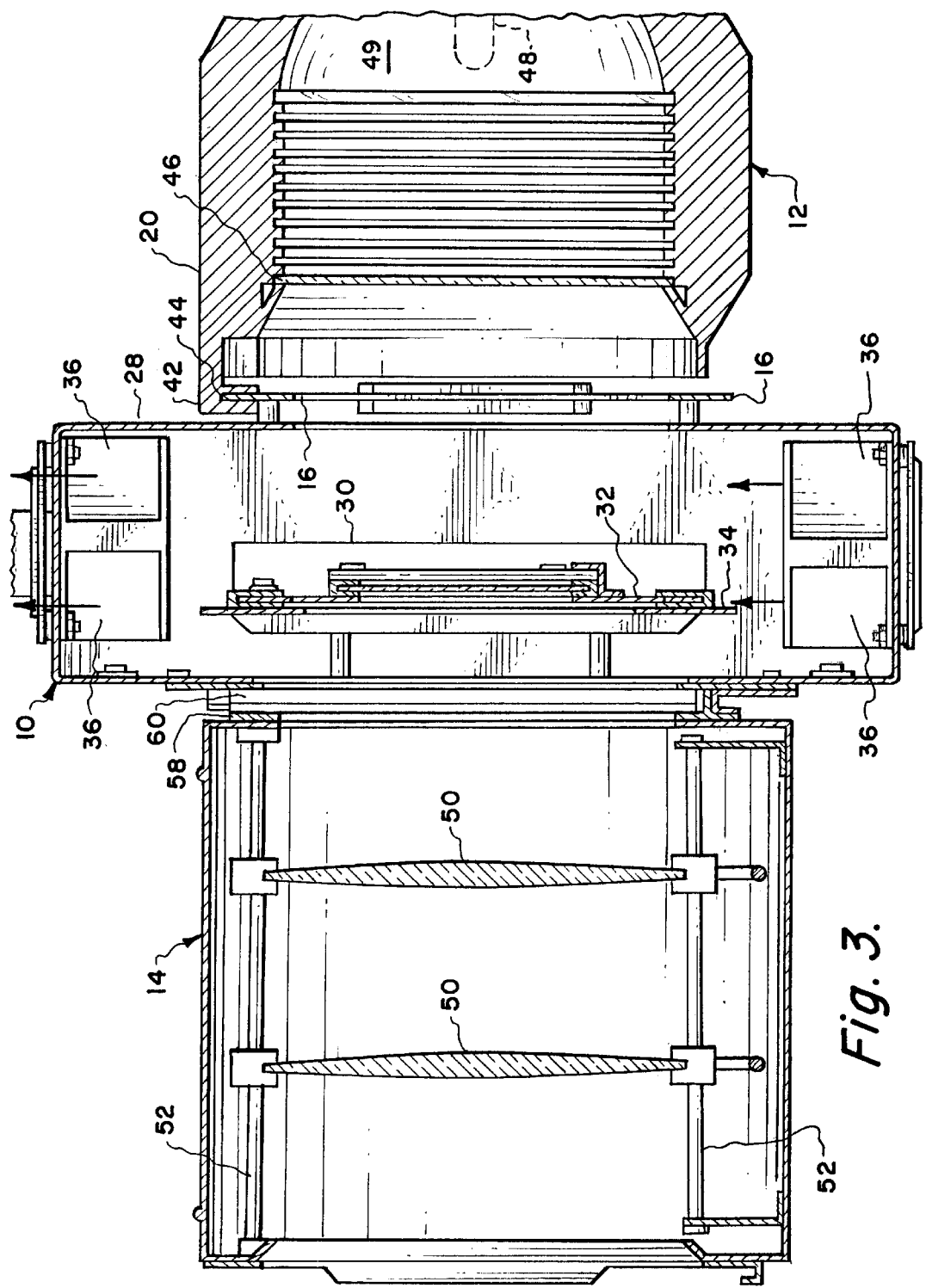
FIG. 3 is a sectional view taken at 3—3 of FIG. 2.

The construction of the components is shown in greater detail in FIG. 3. Light housing 20 has mounting extensions 42 having slots 44 that engage mounting flange 16 on cooling and film frame housing 28. Three mounting flanges 42 are provided on light source housing 20; two on the side and one on top to securely support light source 12 on cooling and film frame section 10. Light source 12 also preferably includes a clear lens 46 to protect lamp 48 from dirt and dust, and accidental damage.

Lens barrel 14 has a pair of lenses 50, independently and adjustably mounted on alignment rods 52 with locking wings nuts 38, 40. Loosening of wing nuts 38, 40 allow independent adjustment of lenses 50 on alignment rods 52. Preferably, lenses 50 are white plate tempered, water clear with an anti-reflective coating. This lens arrangement is preferred because conventional projectors that use double lenses can lose up to sixteen percent (16%) of the projection light. Lens barrel 14 has a mounting flange 58 that engages flange 60 on cooling and image frame housing 28. To remove and replace either light source 12 or lens barrel 14, an upward force can be applied to detach them from the flanges 16 and 60 respectively on housing 28.

Cooling and image frame section 10 has slide rails, 34 for receiving and guiding image frame 32 inserted through slot 30 in the side of housing 28.

Figure 4:
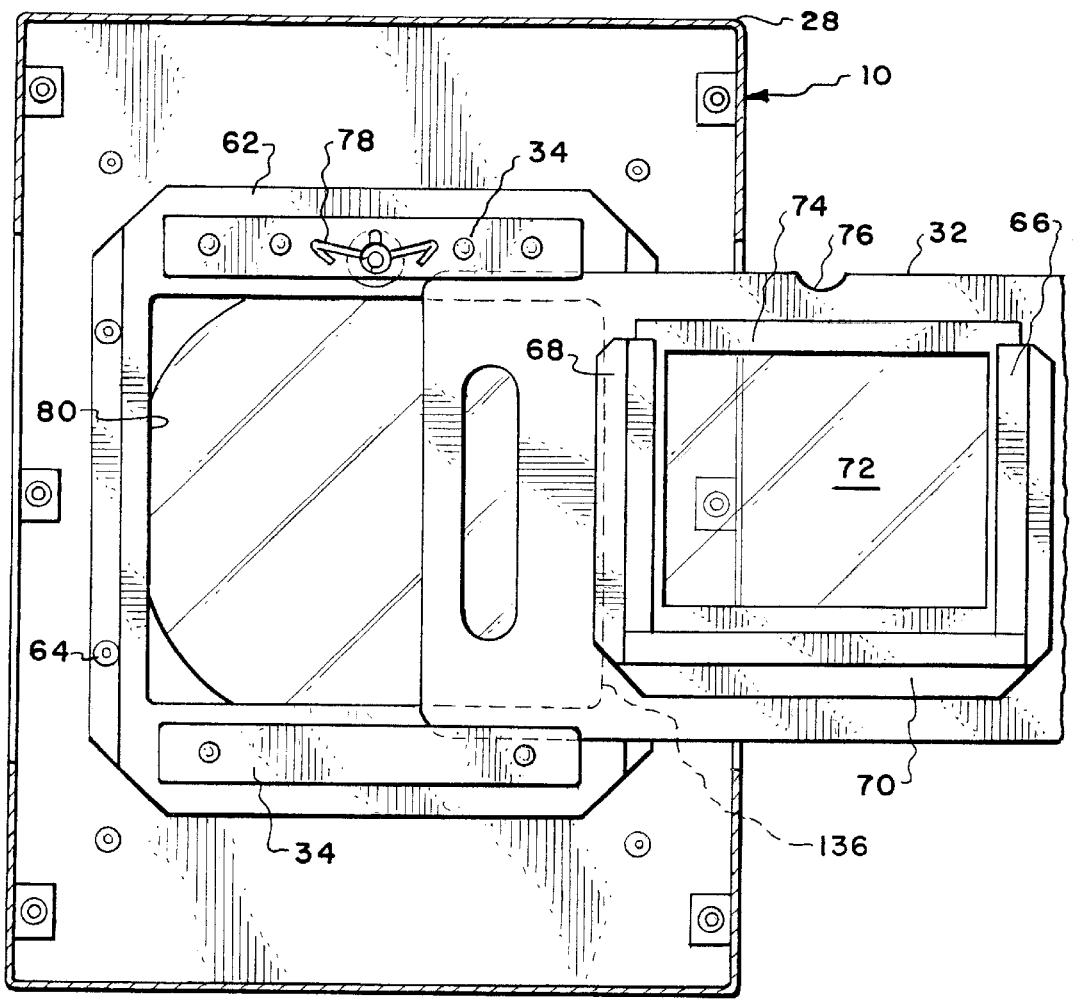
FIG. 4 is a sectional view taken at 4—4 of FIG. 1.

The mounting of an image, in cooling and image mounting section 10, is shown in greater detail in FIG. 4. Housing 28 has mounting brackets 62 for mounting slide rails or glides 34 at the top and bottom on housing 28 above and below the gate. Mounting bracket 62 is securely fastened to housing 28 by rivets 64, or any other suitable means. Slide rails are constructed to provide a slot for receiving and guiding image mounting frame 32.

An image slot is formed by vertical brackets 66 and 68 and horizontal bracket 70. Film image or transparency 72, mounted in border 74, is dropped into the slot formed by brackets 66, 68 and 70. Film frame 32 is then inserted through slot 30 in housing 28 until it engages guides formed by slide rails 34. Image 72 on film is positioned by alignment notch 76, engaging spring 78 at the center of the image gate 80. Thus, to display the image on a transparency, the transparency is first inserted in the mounting slots and film frame 32 is then inserted in slide rails 34 until spring 78 engages aligning notch or detent 76. Proper alignment can be determined by pushing film image frame 32 into slide rails 34 until a positive "snap" is felt when spring 78 engages aligning notch 76.

Figure 7:
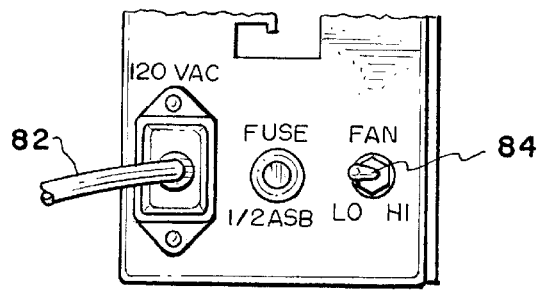
FIG. 7 is a view of the power panel and dual fan speed control switch taken at 7—7 of FIG. 5.

Two sets of whisper fans 36 (FIGS. 2 and 3) are powered by 120 volt AC power cord 82 and controlled by dual speed switch 84. When speed switch 84 is in the high position, full power is applied to all four cooling fans. When fan speed switch 84 is in the low position, as shown in FIG. 7, a 250 ohm resistor is switched into the circuit which cuts the fan speed in half. Optionally, a potentiometer could be used for variable control of fan speed. For most purposes, the low speed of the fan may be used and provides very quiet operation of the system in contrast to the very noisy cooling fans in the presently available scene projecting machines.

The operation of the cooling fans is shown in FIGS. 6 and 7. When power cord 82 is plugged in, fan speed switch 84 controls the speed and operation of whisper fans 36. As previously stated, whisper fans 36 provide sufficient cooling for most purposes in the low or half speed position. Whisper fans 36 draw cooling air from beneath housing 28 and blow it upward across film image or transparency 72 (FIG. 4). Whisper fans 36, at the top of the housing, draw the warmed air that has flowed over the film transparency and discharge it from housing 28. Thus, whisper fans 36 draw air into housing 28 and then expel it out through the top of the housing as illustrated by the arrows. The flow of cooing air assists in keeping the temperature of the film image in a safe range. Light source 12, shown in FIG. 3, is preferably comprised of a halogen lamp 48 and a cold coated reflector 49, visible through housing 28 in FIG. 5. Cold coated reflector 49 is a heat filtering reflector having a dichroic aluminum coating to disperse or draw up to ninety percent of the heat from halogen lamp 48 away from the plane of film image 72.

Figure 8:
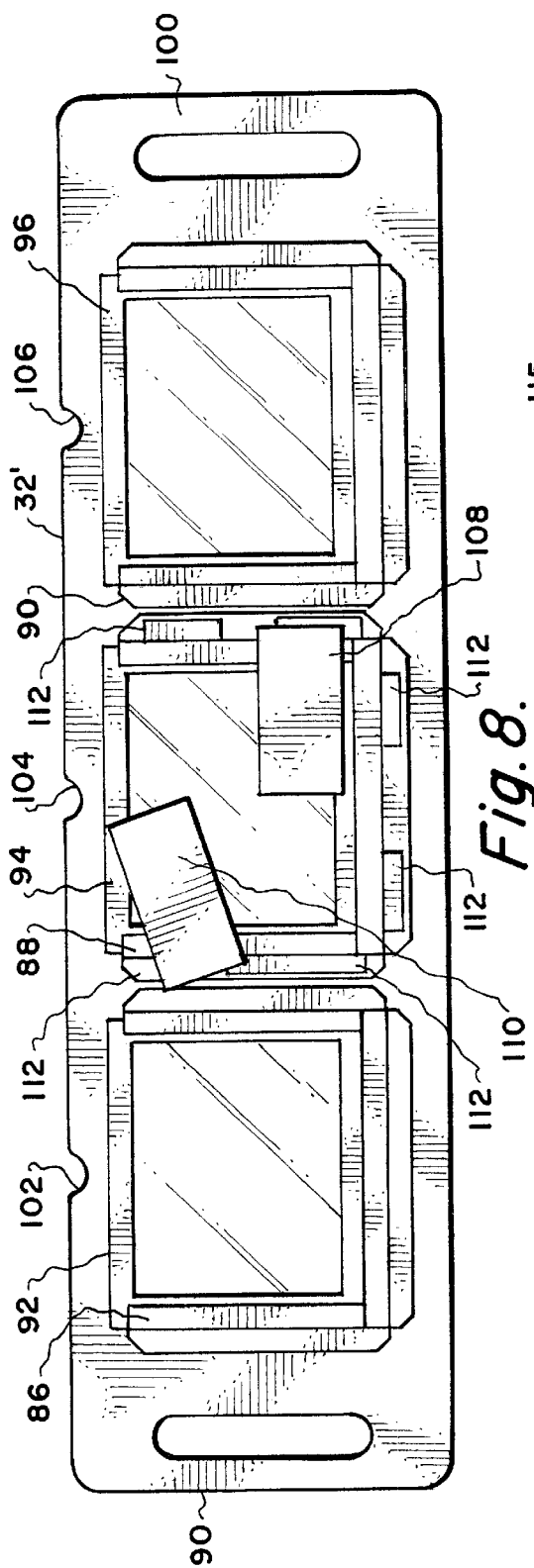
FIG. 8 is a plane view of a multiple image changing frame with image cropping shutters.

Film frame 32, shown in FIG. 4, can be a single image frame or can hold multiple images as illustrated in FIG. 8. Film frame 32', shown in FIG. 8, is comprised of three film image slots 86, 88 and 90 for receiving three film images 92, 94 and 96. Film frame 32' is inserted in slot 30 and advanced by pulling or pushing on handles 98 and 100 on each end. Each film frame is positioned in the gate by engaging spring 78 (FIG. 4) in any one of detents 102, 104 and 106. When spring 78 engages these detents, the image will be properly positioned at the gate for display.

In an optional, but preferred embodiment of the invention, cropping plates or shutters 108 and 110 are provided to crop any portion to the desired image. Cropping shutters 108 and 110 are held in place by a series of magnets 112 around the edges of film image slot 86, 88 and 90. The use of magnets 112, around each image slot, allows shutter frames 108 and 110 to be positioned to crop or block selected portions of the image of course, metal shutters 108 and 110 can be any shape or configuration desired, and are easily positioned to provide the appropriate cropping of the image. Further, the size, shape and number of metal cropping shutters 108 and 110 can be selected as desired.

Figure 9:
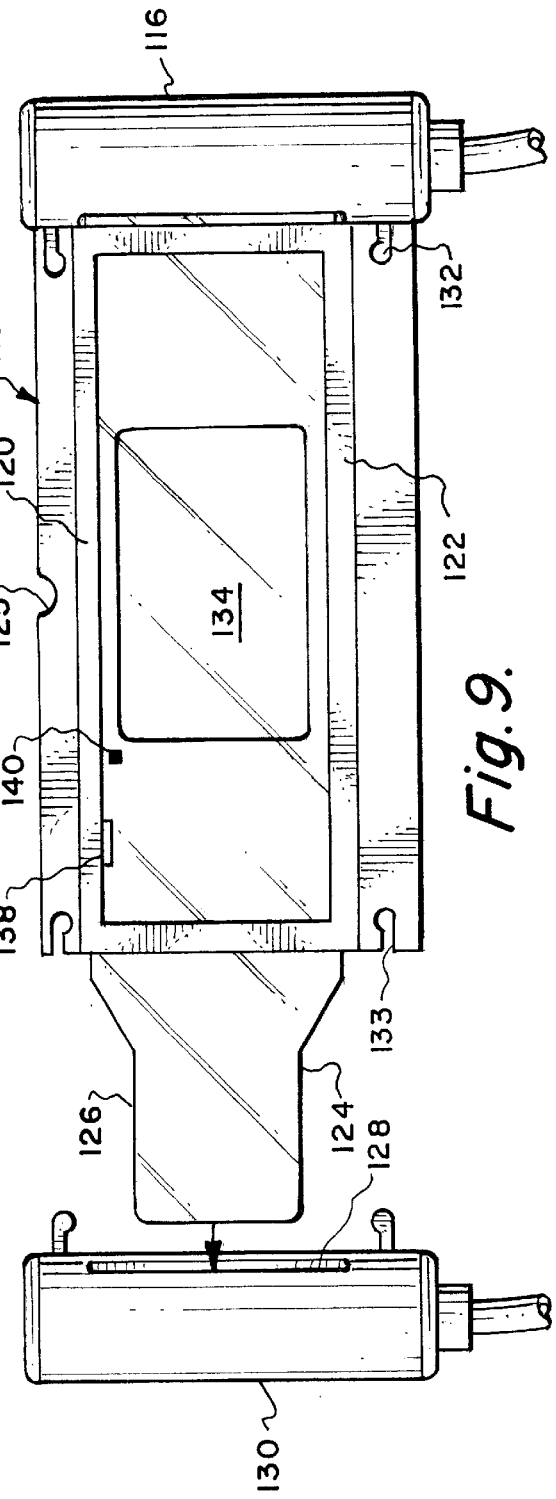
FIG. 9 is a plane view of a motorized image frame for sequentially displaying multiple images one by one.

Another alternative is to provide a motor driven image frame system as illustrated in FIG. 9. In this embodiment, a film frame 115 is provided with a motorized film canister 116 at one end, the image being fed into recesses or guides formed by brackets 120 and 122. Leader end 126 of film 124 is fed into a slot 128 in a second motorized canister 130 to automatically advance the film sequentially frame by frame by remote control. Motorized canisters 116 and 130 are secured to film frame 115 by pins 132 engaging slots 133 as shown. Alternatively, motorized canister 116 could be permanently attached to one end of film 124 with motorized canister 130 being attached after film frame 115 has been inserted in the image projector. After leader 126 has been fed into motorized canister 130, and the first frame 134 positioned in the gate, the system can function to automatically advance film 124 forward or backward one frame at a time by remote control. Film frame 115 is positioned and aligned by alignment notch 125 engaging spring 78 (FIG. 4), in the image projector with the first frame 134 positioned in the gate. The edge of the gate is indicated by dotted line 136.

Film is advanced forward or backward one or more frame at a time and positioned by a photo or magnetic sensor 138 that senses a foil or strip 140 on film 124. Sensor 138 is connected to motorized canister 130 to stop advancement of film 124 after advancing a selected number of on frames. Preferably, the motorized film advancement system can hold up to approximately thirty frames for sequential or random display for presentations.

Figure 10:
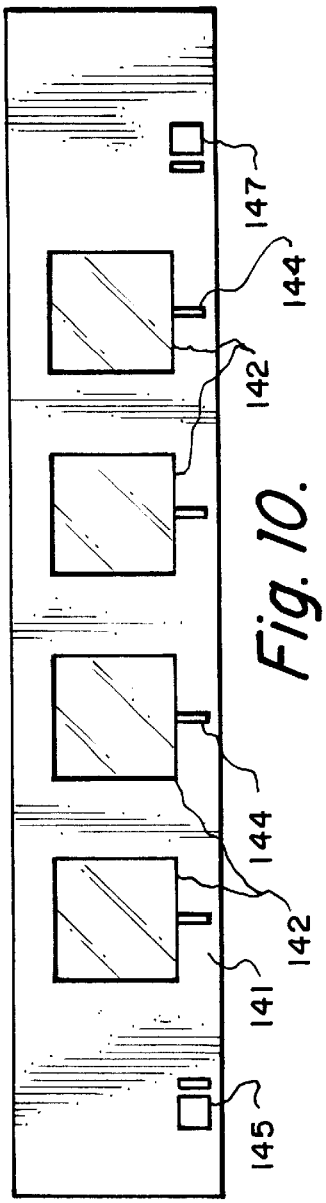
FIG. 10 is an illustration representing the front view of an unrolled image string with index pads.

An unrolled image string is illustrated in FIG. 10 and is comprised of a one-way scroll string made up of individual pieces of acetate cut at approximately 5.5 inches×5.7 inches having 4 inch×4 inch centered image areas. These pieces are joined together, for example with tape, to form an image scroller 140 containing from two to 30 images. Each image 142 has an aluminum tab 144 centered on the bottom edge of the imaging material such as acetate.

Figure 11:
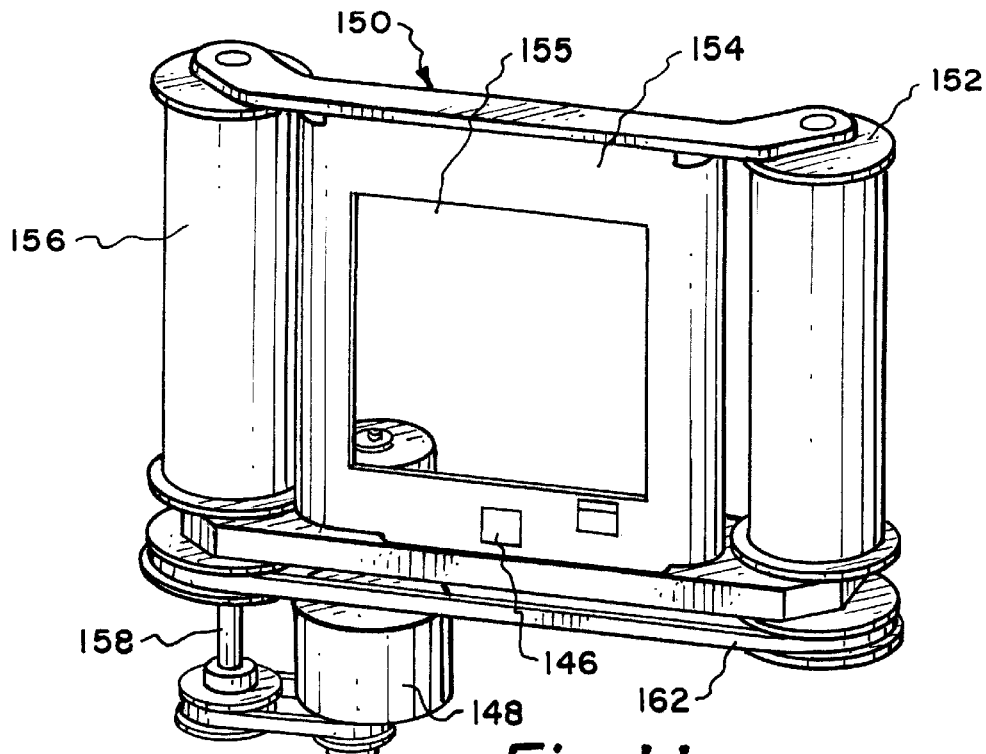
FIG. 11 illustrates an automatic scroller for receiving the image string illustrated in FIG. 10.

Aluminum sensing tab 144 passes over a near-field sensor 146 (FIG. 11) addressed by a standard signal from a DMX 512 control console. As aluminum tab 144 passes over sensor 146 it interrupts electrical current to motor 148 stopping the motion and aligning the 4 inch×4 inch image 142 at aperture gate 150. Scrolling motor 148 can then be activated again by a signal from a DMX 512 control console to begin movement again which until the next aluminum sensor tab 144 stops at the next image. Start and stop tabs 145 and 147 (i.e., "begin" and "end") are provided at each end of image scrolling string 140. The procedure described produces a simple image-indexing system having the ability to sequentially or randomly access images on the scrolling image screen. The control console advances film from canister 152 past aperture 154 in aperture plate 150 onto canister or spool 156 or vice versa.

Scrolling motor 158 simultaneously drives shaft 158 of spool 156 through belt 160 and spool 152 through belt 162. To begin the process the image string containing up to 30 images is first loaded into canister 152 with the tail or tab engaged in take-up reel in spool or canister 156 in a manner well-known in the art. Automatic remote-control, multi-image changer or scroller 150 for scenic projections can use convenient and economically acetate material because it is constructed for mounting in the frame of a reduced-heat image projector illustrated in FIG. 12.

Automatic image changer or scrolling system 150 is mounted on frame 164 attached to the housing of low-heat fixed image projector 166 having low-speed fans 168 and six inch focusing lenses 170. The system takes advantage of the reduced heat of fixed image projector 166 to provide a projection device that can scroll images at full color on acetate media.

Figure 12:
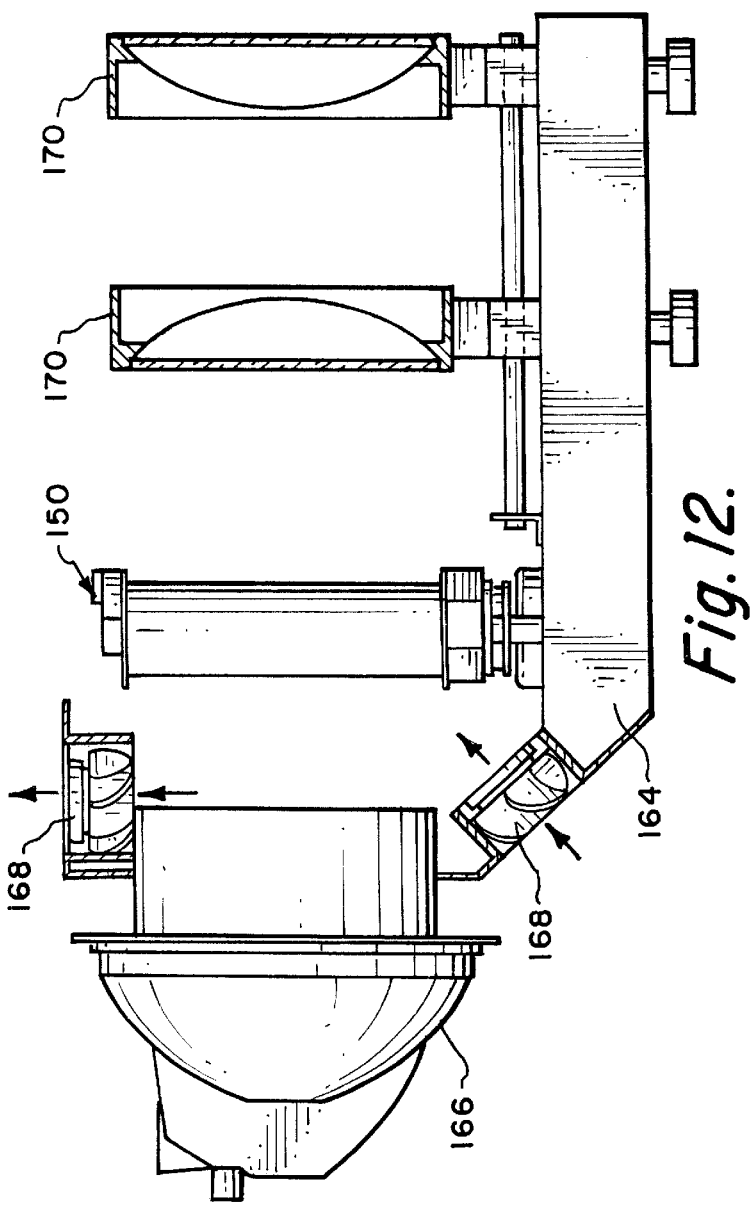
FIG. 12 is a side elevation illustrating the automatic image changer or scroller mounted on the frame of a low-heat image projector.
Figure 13:
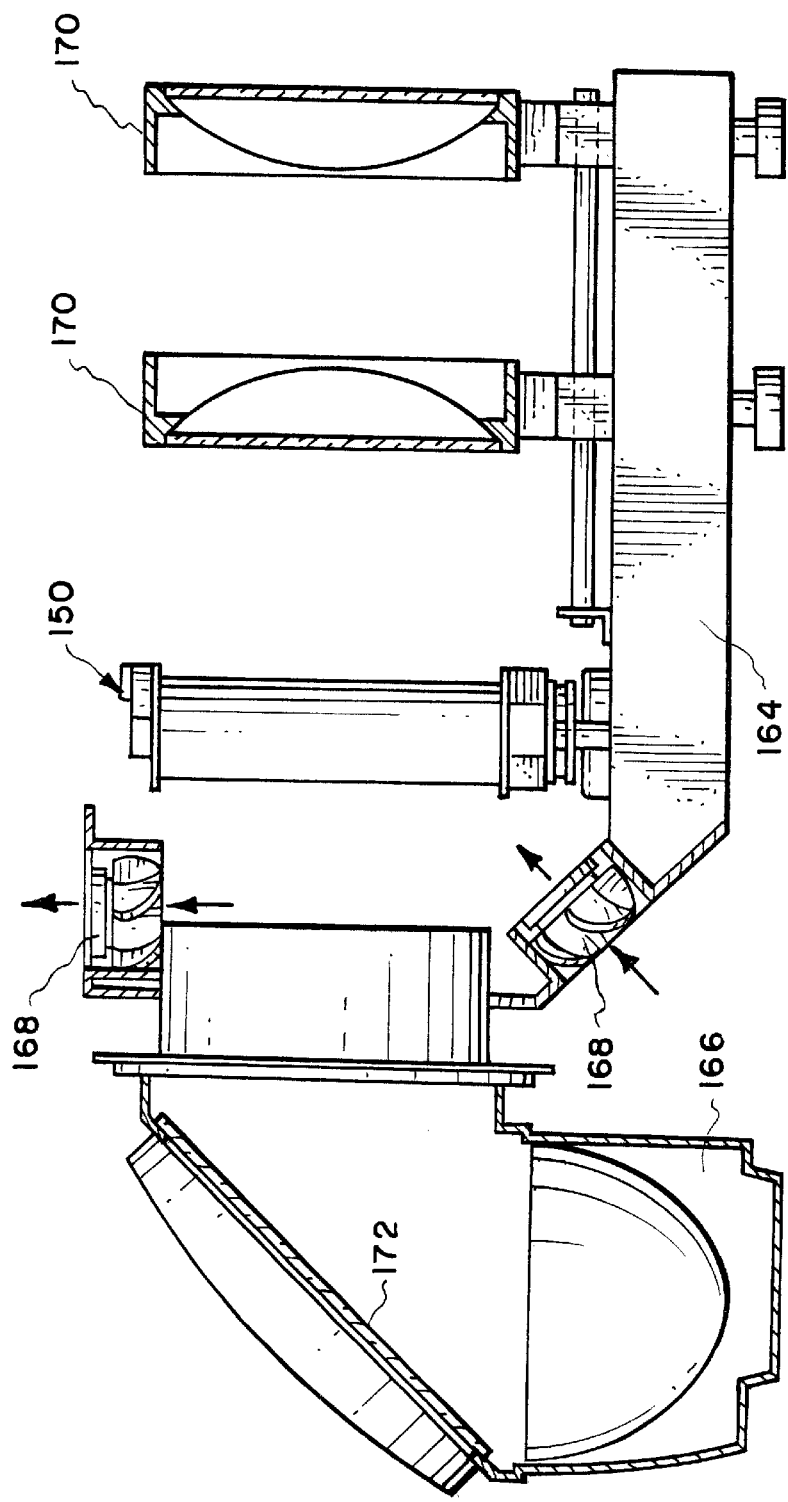
FIG. 13 is a side elevation similar to FIG. 12 illustrating the automatic image scroller mounted on the frame of a modified low-heat image projector.

An optional embodiment of the system illustrated in FIG. 12 is shown in FIG. 13. In this figure automatic image scroller 150 is mounted on a frame 164 between low-heat fixed image projector light 166 and six inch focusing lenses 170 as before. However fixed image light projector 166 includes a cold-coated flat mirror 172 positioned at about 45° to the low heat fixed image projection light 166. Images are projected through lenses 170 and are sequentially or randomly shown as desired. Aluminum sensing tabs 144, 145 and 147 (FIG. 10) are sensed to position the images in the image frame 155 on image plate 154 of automatic image scrolling device 150.

Figure 14:
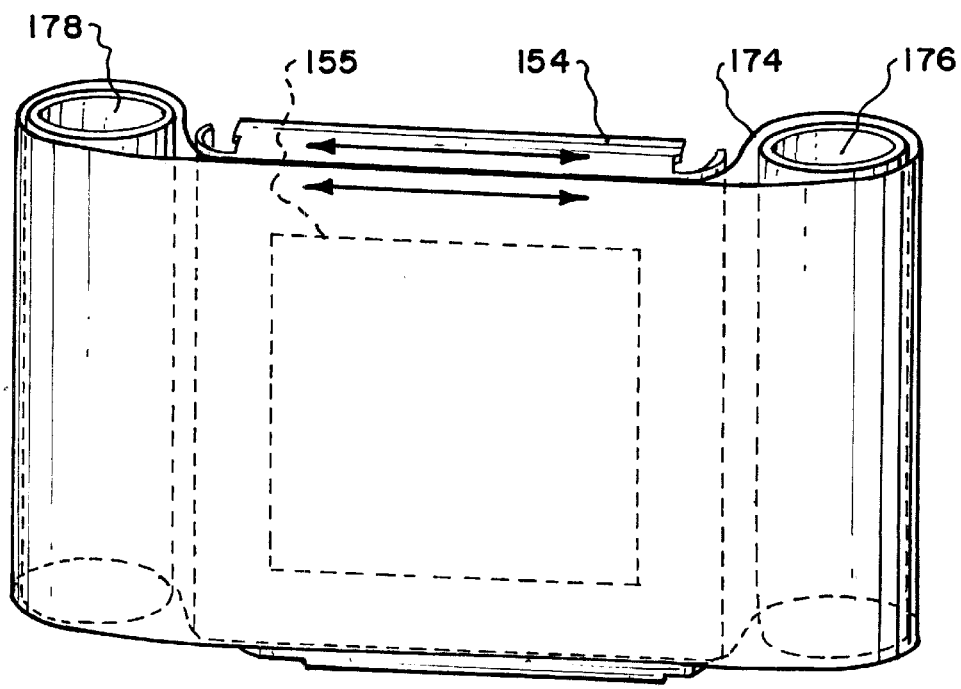
FIG. 14 illustrates an endless loop variation for the scroller image string which allows two images to pass in opposite directions along the same focal plane.

An endless loop variation of the scrolled image string is illustrated in FIG. 14. This arrangement allows two images to pass in opposite directions on the same focal plane. This is achieved by printing the desired images onto acetate and fastening their ends together, such as with tape, forming a loop 174 passing over drum 176 on one end and drum 178 on the other end of the automatic image changer 150. No conventional units allow loops having images on the same focal plane.

Figure 15:
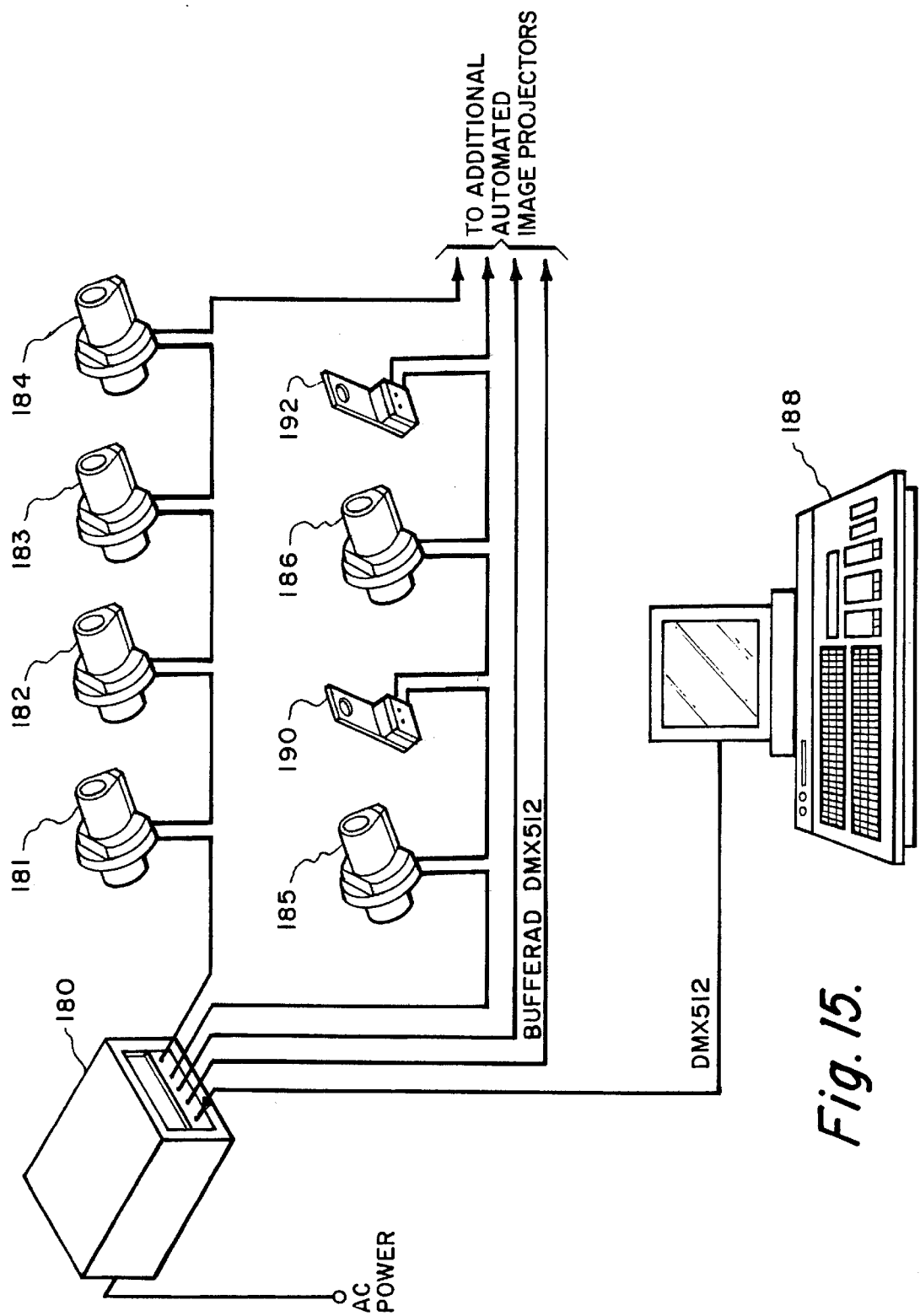
FIG. 15 illustrates an image projection system using multiple, automated, image changers with heat-control image projectors for use in theater, film, entertainment and event production.

A system for using multiple automated image changers is illustrated in FIG. 15. Multiple channels are supplied with power from power supply 180. Fixed image projectors having automated image changers or scrolling devices 181 to 186 may be connected to power supply 180 controlled by DMX 512 control console 188. Each image projector with automated image changer 181 to 186 may be separately or simultaneously controlled by the control console.

A unique variation is the inclusion of offset image rotators 190 and 192. In this variation various effects can be projected using a variety of low-cost materials. Offset image rotators 190 through 192 use geared discs which can be rotated in the same or opposite direction with both discs on the same focal plane. This allows rotating images providing unique effects such as rain or fire to be focused at a distant location. No conventional imaging systems or units incorporate laid, an offset rotator capable of using film, acetate, or plastic.

The present invention has a number of unique advantages of the presently available devices known as "scene machines" that project a fixed image on a surface. These machines are expensive, heavy and require noisy cooling equipment. Further, they frequently damage the film after only a short period use. For that reason, images must be made on heat resistant material such as glass. With the invention disclosed herein, film can be displayed and used on regular transparency film without any serious damage even after long periods of exposure. The amount of heat reaching the film is kept low enough that it will not damage the film.

In the first embodiment, an image is placed in an image frame, which is inserted in guides or rails in the image projector. Scenes are changed by manually advancing the film frame, which may contain up to four images. Optionally, a motorized film frame can be provided to display up to approximately thirty images by using a motorized film canister to advance the film forward or backward one or more frames at a time. A sensing system allows the film to be advanced forward or backward to any selected frame.

In a further optional embodiment, shutters that allow cropping images in any manner desired, are easily provided by magnets that are attached to the metal film frame. The shutters can be any shape or configuration desired, and can be easily positioned to crop an image.

This invention is not to be limited by the embodiment shown in the drawings and described in the description which is given by way of example and not of limitation, but only in accordance with the scope of the appended claims.

What is claimed is:

1. A fixed image projection apparatus comprising;

an image loading and cooling section for loading an image in said projecting apparatus;

image loading means;

image mounting means mounting said image loading means in said image loading and cooling section;

lens means detachably mounted on said image loading and cooling section;

a light source detachably mounted on said image loading and cooling section opposite said lens means, said light means comprising;

a high energy lamp; and a cold coated reflector comprising a cold coated flat mirror positioned to receive and direct light from said high energy lamp toward said lens means, said cold coated reflector transmitting heat and reflecting light;

whereby said light source projects said image through said lens with minimum heat damage.

2. The apparatus according to claim 1 in which said cold coated flat mirror is positioned opposite said light source at an angle of approximately 45 degrees.

3. The apparatus according to claim 2 in which said image loading means comprises;

image frame means for mounting one or more images;

positioning means in said image mounting means for positioning said image frame means in slide rails with said image aligned with said lens in said light source.

4. The apparatus according to claim 3 in which said positioning means comprises a notch in said image frame; and a spring in said image mounting means for engaging said notch to hold said image frame in alignment with said lens and light source.

5. The apparatus according to claim 4 in which said lamp in said light source is a halogen lamp.

6. The apparatus according to claim 5 in which said halogen lamp has a power output in the range of 500 to 1,000 watts.

7. The apparatus according to claim 2 in which said image mounting loading and cooling section comprises a housing having open slots on both sides; a light source mounting means for detachably mounting said light source on the back of said housing; lens mounting means for mounting a lens on the front of said housing; and means for cooling said housing.

8. The apparatus according to claim 7 in which said cooling means comprises at least one fan on the bottom of said housing and at least one fan at the top of said housing; one of said fans positioned to draw cooling air into said housing the other of said fans positioned to expel warm air out of said housing; thereby cooling the area around the plane of said image.

9. The apparatus according to claim 8 in which said at least one fan at the top and bottom of said housing comprises a pair of fans.

10. The apparatus according to claim 9 including a speed control for controlling the speed of said fans.

11. The apparatus according to claim 10 in which said speed control is a switch means for operating said fans at two speeds of full and half speed.

12. The apparatus according to claim 2 in which said image frame means include means for feeding a plurality of images.

13. The apparatus according to claim 12 in which said means for feeding a plurality of images comprises; a film guide on said image frame; a first motorized film canister for holding a roll of film mounted on one end of said image frame means; a second motorized canister means mounted on the other end of said image mounting means for automatically sequentially feeding images on said film forward or backward through said film guides on said image frame; alignment means for automatically aligning each image in a gate on said image mounting means.

14. The apparatus according to claim 13 in which said alignment means comprises sensing means mounted on said image frame means; position sensing indicator on said film representing each frame; whereby said sensing means senses said sensing indicator and stops said film after advancing one image.

15. The apparatus according to claim 14 in which said sensing indicator comprises a foil strip on said film guide.

* * * * *